United States Patent [19]
Kalish et al.

[11] Patent Number: 5,644,733
[45] Date of Patent: Jul. 1, 1997

[54] DUAL COUPLED PARTITIONABLE NETWORKS PROVIDING ARBITRATION LOGIC FOR MANAGED ACCESS TO COMMONLY SHARED BUSSES

[75] Inventors: David Mark Kalish, Laguna Niguel; Russell Lee Marrash, Irvine; Gary Carl Whitlock, Mission Viejo; Kha Nguyen, Anaheim, all of Calif.

[73] Assignee: Unisys Corporation, Blue Bell, Pa.

[21] Appl. No.: 443,974

[22] Filed: May 18, 1995

[51] Int. Cl.$^6$ .................................................. G06F 13/362
[52] U.S. Cl. ...................... 395/293; 395/308; 395/200.01
[58] Field of Search ..................................... 395/293–298, 395/728, 729, 732, 200.01, 200.02, 200.08, 308

[56] References Cited

U.S. PATENT DOCUMENTS

| | | | |
|---|---|---|---|
| 4,897,786 | 1/1990 | Pimm et al. | 395/288 |
| 4,932,040 | 6/1990 | Barlow | 375/362 |
| 5,067,071 | 11/1991 | Schanin et al. | 395/293 |
| 5,367,643 | 11/1994 | Chang et al. | 395/309 |
| 5,386,517 | 1/1995 | Sheth et al. | 395/880 |
| 5,418,914 | 5/1995 | Heil et al. | 395/293 |
| 5,440,698 | 8/1995 | Sindhu et al. | 395/200.08 |
| 5,471,590 | 11/1995 | Melo et al. | 395/288 |

*Primary Examiner*—Jack B. Harvey
*Assistant Examiner*—Sumati Lefkowitz
*Attorney, Agent, or Firm*—Alfred W. Kozak; Mark T. Starr; Steven R. Petersen

[57] ABSTRACT

Two partitioned systems are interconnected by bus exchange modules which connect to first and second system common busses. Each system common bus shares three or more requestors, and an arbitration logic unit in each partition manages bus access priority depending on certain existing conditions. Equitable access to each system bus is allocated and no one particular requestor will be locked out from bus access. Deadlock and starvation are prevented by setting one requestor module for normal top priority but also allocating secondary priority to the remaining two requestor modules by toggling and rotating priorities among these two requestor modules. Additionally, the arbitration logic allows the two requester retrying modules to request the bus at a temporarily higher priority, but limiting the number of retry cycles allowed to any given requesting module.

3 Claims, 8 Drawing Sheets

FIG. 4B $$\text{HOLD} = \overline{(ST2 + ST6)} + \text{BUSY}$$
$$\text{INC} = (ST2 + ST6) * \overline{\text{BUSY}}$$
$$\text{RESET} = (ST1 + ST5) * \overline{\text{BUSY}}$$

+ AND
* OR
C COUNT
ST STATE
— = INVERSION OPERATION

DUAL COUPLED PARTITIONABLE NETWORKS PROVIDING ARBITRATION LOGIC FOR MANAGED ACCESS TO COMMONLY SHARED BUSSES

FIELD OF THE INVENTION

This disclosure relates to separate digital networks which are coupled to each other for transfer of data while also allocating access to commonly shared system busses in each network.

CROSS REFERENCES TO RELATED APPLICATIONS

This application is related to copending applications entitled "Arbitration System for Bus Requestors With Deadlock Prevention" filed as U.S. Ser. No. 08/443,973 and dated May 18, 1995, and to U.S. Ser. No. 08/688,247 filed Apr. 26, 1996 entitled "DUAL DOMAIN DATA PROCESSING NETWORK WITH CROSS-LINKING DATA QUEUES AND SELECTIVE PRIORITY ARBITRATION LOGIC". This disclosure is related to a U.S. Pat. No. 5,442,754 entitled "RECEIVING CONTROL LOGIC SYSTEM FOR DUAL BUS NETWORK".

BACKGROUND OF THE INVENTION

Present-day computer systems generally use a plurality of resources such as a central processing module, an input/output module, a main memory module and sometimes other functional modules. Quite often there is a interconnecting communication system designated as a system bus which becomes a shared resource used for transferring data between the various resource modules.

Since the system bus is only a single shared resource among various resource modules, then there is a question of access to uses of the system bus among the various competing devices. It is necessary that no one particular resource module monopolize the system bus and that there must be some system of fair allocation for bus usage among the various resource modules so that no one particular resource module is starved out of usage of the system bus.

As a result, certain types of arbitration systems or arbitration circuitry have been developed in order to allocate bus usage among the competing resource modules. Some systems use a straight priority scheme wherein the various resource, modules are given priority levels which gives them priority of access to the system bus.

There are other types of arbitration schemes such as a "round-robin" scheme in which all of the requestors or resource modules are given the same priority level but alternated in sequence for access to the bus.

The presently described arbitration logic system provides logic that can choose among three basic resource modules or requestors as to which one will be provided the use of a shared system bus at any given point in time. This arbitration logic operates to prevent any deadlock conditions or starvation conditions which would deny access to one or more of the resource modules.

Arbitration systems are also closely linked to certain types of problems which occur such as "deadlock" problems where two requesting modules can cause each other to get into a state or condition where neither of the modules can finish its operating task. Other situations occur designated as "starvation" of a resource module, where the particular resource module cannot finish its operative task clue to conditions that occur in the system.

The presently described system functions to insure equitable arrangements for bus access among competing resource modules requesting access time to use a commonly-shared bus.

SUMMARY OF THE INVENTION

A first network involving a central processing module and input/output module which share a common system bus is controlled by arbitration logic in a system control module. The common system bus of the first network also has a bus exchange module which shares the common system bus with the input/output module and the central processing module. The first network's bus exchange module provides means for receiving data from a second digital network through the second digital network's system control module.

The second digital network also involves a second central processing module, a second input/output module and a second bus exchange module which share a common system bus, the allocation of which is managed by a second arbitration logic unit in the second network's system control module. The second network's bus exchange module enables the receipt of data from the first network's system bus by means of the first system control module.

Thus, data transfers and communication between the first network and the second network are enabled via the first system common bus through the first system control module, to the second bus exchange module. Likewise, data transfer and communication is provided from the second network's common system bus through the second system control module to the first bus exchange module.

Arbitration logic in the first system control module and in the second system control module monitors and manages the use of the first common system bus in the first network and the second common system bus in the second network.

Priority in each of the first or second networks is allocated firstly to the bus exchange module (BEM) respectively in the first and second networks. Secondarily, the next level of priority will toggle between the Central Processing Module (CPM) and the input/output module (IOM). After initialization, the IOM will get a temporary "high" priority till it has completed a bus access OP after which the CPM will get "high" priority on the next cycle of access. Exceptions occur in those situations where recurring retry operations of a requesting module (such as the input/output module or the central processing module) require that a temporary higher priority be given to the requesting module which had been undergoing retry operations.

Thus, each of the first network and the second network will manage its own priorities of bus access allocation, while at the same time enabling intercommunication to occur between the first and second networks and their system busses, and their attached resource modules.

DESCRIPTION OF PREFERRED EMBODIMENT

Figure 1:
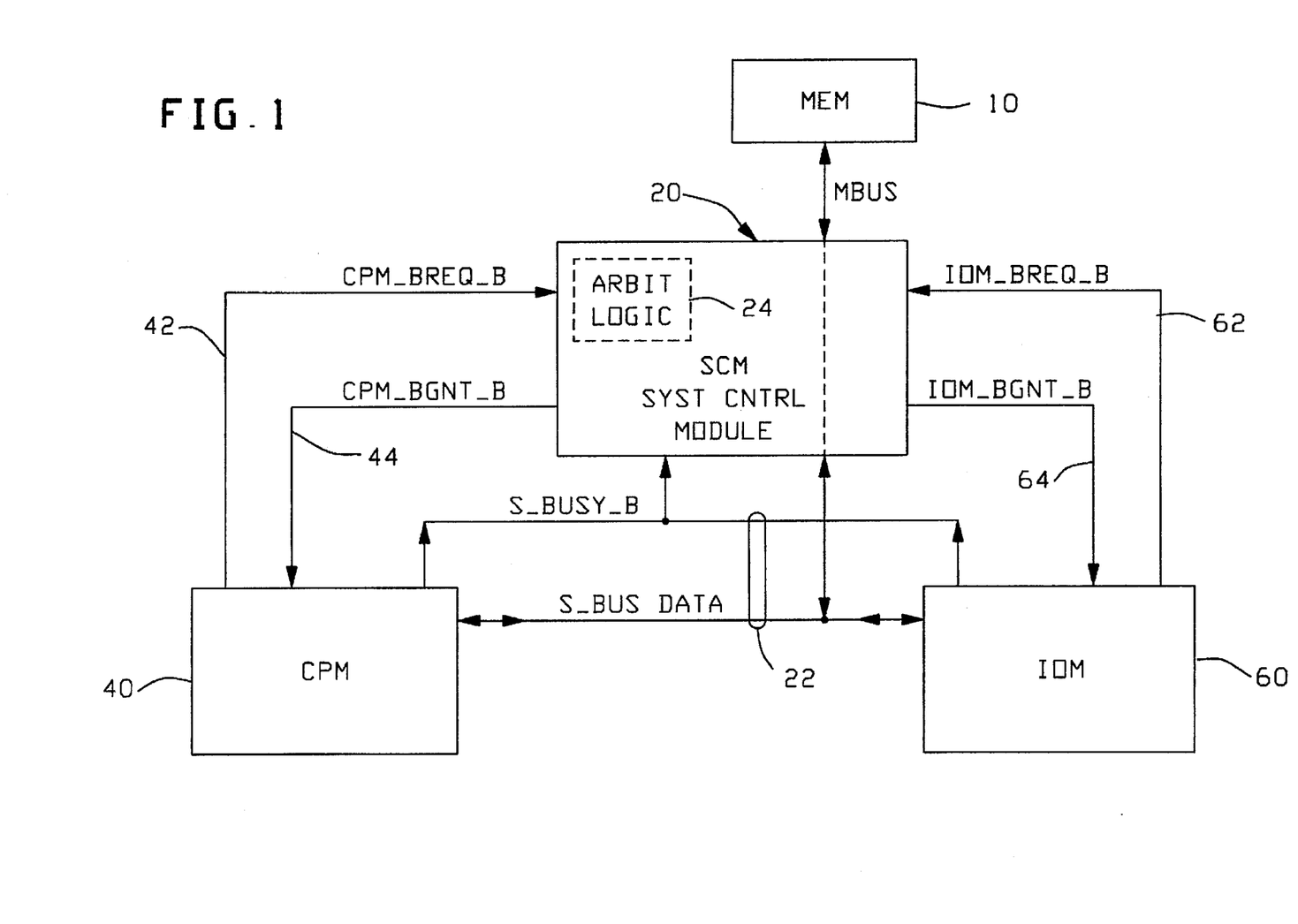
FIG. 1 is a block diagram of a computer system, together with its arbitration architecture designated as a "one-by" system.

FIG. 1 is a block diagram illustration of a computer system designated as having an architecture of "one-by" in which three resource modules are used to share a common system bus 22. The three resource modules which share the system bus 22 are indicated as the central processing module CPM 40, the input/output module IOM 60 and the system control module SCM 20. The system control module is seen to have a main memory module 10.

The central processing module 40 and the input/output module 60 both send and receive system commands on the system bus 22. These may include read operations and write operations to the memory 10 or the passing of messages between the two modules CPM 40 and IOM 60.

The system control module SCM 20 does not send commands on the system bus 22, however it must receive all memory operation requests and then forward the addresses and data between the system bus 22 and the main memory 10.

The system control module 20 also provides the logic that determines which particular module may be allowed to broadcast its command onto the system bus 22 at any given time. This is generally designated as the BUS-GRANT.

The arbitration logic 24 in the system control module 20 is often referred to as the bus arbiter.

Before a resource module can broadcast a command to the system, it must first activate a Bus Request signal (BREQ) in order to notify the arbiter logic 24 that a need to use the system bus 22 is imminent. The central processing module 40 and the input/output module 60 each have dedicated request lines shown as CPM-BREQ-B 42 and the IOM-BREQ-B 62, respectively shown in FIG. 1.

If the system bus (SBUS 22) is "not busy", and only one resource module is requesting the system bus 22, then that resource module will be granted the bus during the next clock cycle.

Each resource module also has dedicated bus grant lines seen as CPM-BGNT-B 44 and IOM-BGNT-B 64 also seen in FIG. 1. If the system bus 22 is currently being used for data transfer by a module, then it is currently designated as "busy" and then any other module which is making a bus request must wait until the system bus SBUS 22 is no longer busy, and then this resource module will be the next module to be granted the use of this system bus 22.

The use of the system bus arbiter logic 24 involves considerable more complexity in systems that can couple modules that reside in two different back planes. This type of connected system is referred to as a "two-by" system which is seen in its complete configuration of FIG. 2, and can have up to two central processing modules CPM's and two input/output modules (IOM's).

In order to facilitate communication between two back planes 5A and 5B (FIG. 2), it was necessary to introduce a new module designated as the Bus Exchange Module 50, or BEM. The bus exchange module BEM 50 has been provided with three major functions. These include:

(a) passing a message from a CPM $40_a$ or IOM $60_a$ in one back plane (5A) to a CPM $40_b$ or IOM $60_b$ in the other back plane (5B). Thus, in FIG. 2, the first back plane is designated as 5A and constitutes a partition "0" while the second back plane 5B constitutes the partition "1".

Figure 2:
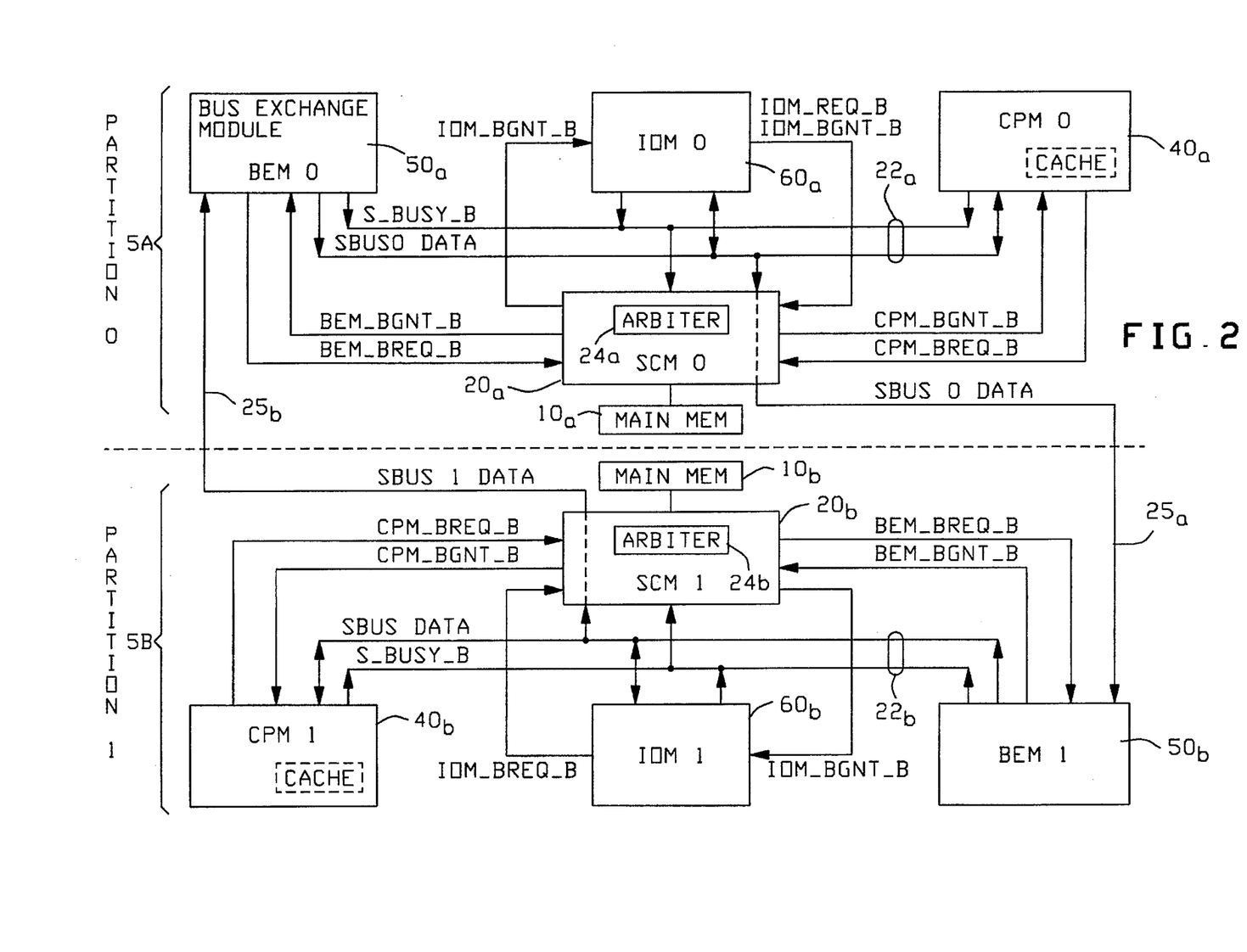
FIG. 2 is a block diagram of a computer system designated as a "two-by" system, where two computer systems are coupled to each other to operate as a single overall system.

(b) allowing a CPM or an IOM in one back plane 5A to access main memory 10b in the other back plane 5B, or this can be a vice-versa situation where a CPM or IOM in backplane 5B is allowed to access main memory 10a in the other backplane 5A.

(c) permitting communication to the CPM $40_a$ when it must invalidate a cache memory in $40_a$ due to a Write operation issued by a processor (either the CPM $40_b$ or the IOM $60_b$) in the other back plane 5B.

Referring to FIG. 2, there is seen a block diagram of a "two-by" system with three bus requestors on each of the two back planes such as 5A and 5B. It will be seen that each system bus $22_a$ and $22_b$ has its own arbiter $24_a$ and $24_b$ residing on the respective SCM modules $20_a$ and $20_b$ in the particular given partition "0" and partition "1".

Now, with the introduction of a third bus requestor such as the BEM $50_a$ and $50_b$, there are three more situations required for the arbitration logic $24_a$ and $24_b$ to handle that complicate the situation. Thus, the arbitration logic 24 must now be capable of handling the following:

Case 1: If the system bus 22 is not busy and two or more modules "simultaneously" are issuing bus requests, then specialized handling is necessary.

Case 2: If one module is using the SBUS 22 and the other two modules simultaneously request use of the system bus 22, then this situation must be handled. In this situation, there can be two competing module requestors concurrently working on retry operations.

Case 3: If one resource module is using the SBUS 22 (S_BUSY_B) and a second resource module makes a bus request (BREQ_B), but before the first module is finished, the third module also makes a bus request, then this situation must be handled.

With these various case situations in mind, the arbitration logic of the presently described system must handle each of these cases in a fair and equitable manner and further operate such that one of the resource modules will have a higher priority than the others in these situations at any given point in time. These operations will be indicated in detail hereinafter.

Figure 3A:
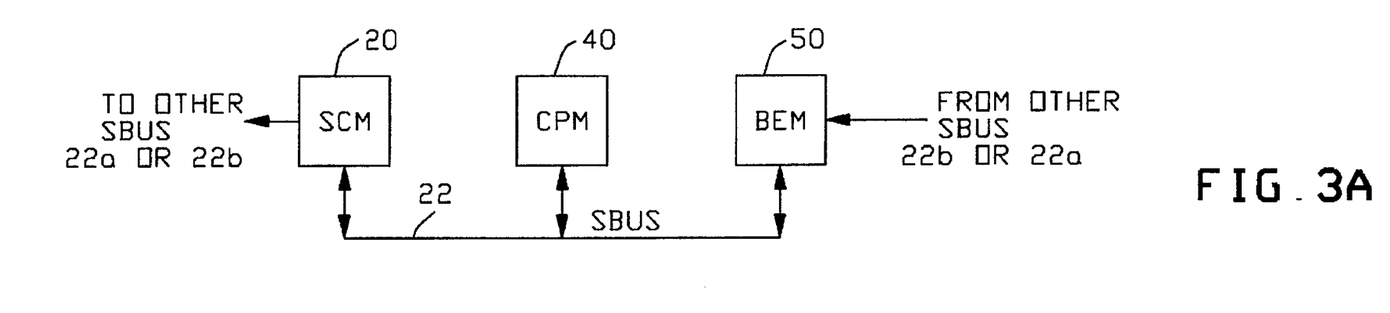
FIG. 3A is a block diagram of a single shared system bus having two requestors.
Figure 3B:
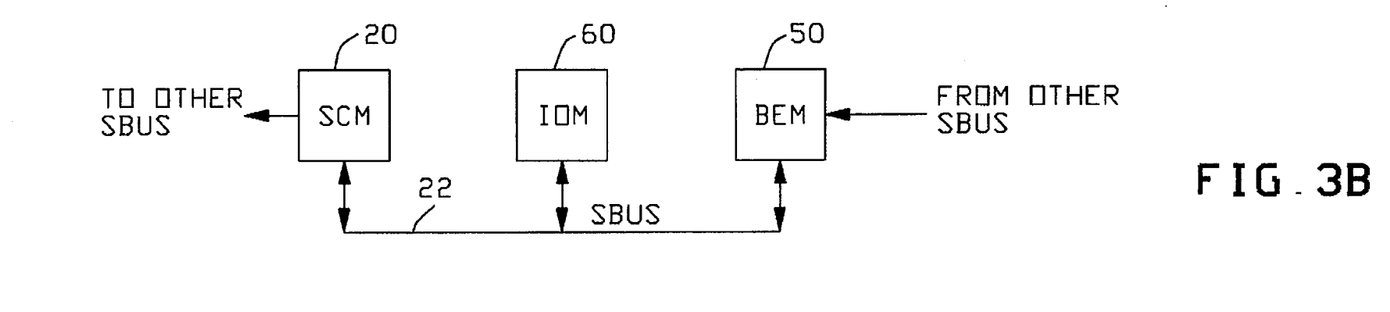
FIG. 3B is a block diagram of a shared single bus also having two requestors which are different requestors.
Figure 3C:
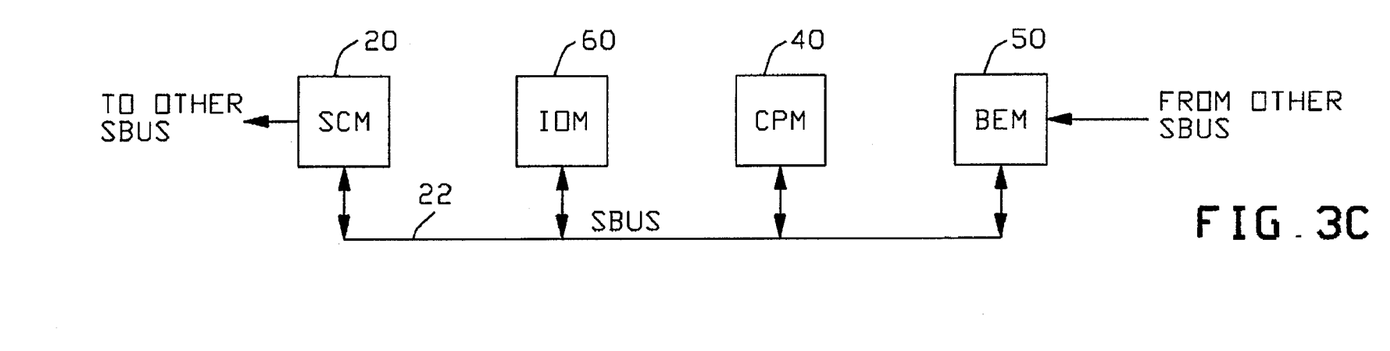
FIG. 3C is a block diagram showing the configuration of a shared system bus working with three requestors.

The presently disclosed arbiter logic design is capable of handling the situation where there are two requestors in a "one-by" configuration and also all of the possible types of "two-by" configurations. These configurations are indicated in FIGS. 3A, 3B, and 3C. Thus, FIG. 3A shows the system bus configuration with two requestors designated as the CPM 40 and the BEM 50. FIG. 3B shows the configuration of the commonly shared system bus having two requestors which are the IOM 60 and the BEM 50. FIG. 3C shows the situation of the commonly shared system bus 22 having three requestors, that is to say, the IOM 60, the CPM 40 and the BEM 50. It will be noted that each of the BEM 50 bus exchange modules receives an input from the other system bus while the system control modules 20 provide an output to the other system bus. Further, it should be noted that in all of the "two-by" configurations, a bus exchange module BEM 50 must be present in each of the two partitions, that is to say, partition 5A and 5B (FIG. 2).

In regard to arbitration procedures, the described system provides the following functions.

(i) The arbiter logic 24 (FIG. 4A) must grant the system bus SBUS 22 to one particular module if one or more modules are requesting use of the system bus at a time when the system bus is "not busy".

(ii) If the SBUS 22 is "busy" when a bus request is made, the bus grant (BGNT) access occurs at one clock after the Bus Busy (BUSY-B) signal is deactivated.

(iii) The Bus Grant (BGNT) must originate from a flip-flop to meet the set-up time requirements on each module. In combinatorial notation the symbol := designates a flip-flop output.

(iv) The arbiter logic 24 must give the bus exchange module (BEM) 50 the "highest" priority such that, in the case of multiple simultaneous bus requests, so that the BEM 50 will be granted the bus first.

Also, if another resource module is requesting the bus while the bus is still "busy", and the BEM 50 makes a subsequent bus request while the other module is still waiting, then the BEM 50 will be "next in line" to use the bus, even though its bus request was made at a later time.

(v) There must be an operational function to prevent starvation of a particular resource module to insure that the module has a fair chance for bus access without being completely locked out (vi) The system must operate to prevent a "deadlock" condition such as when two resource modules are in "retrying" conditional trying to contact each other on an indefinite basis.

It may be noted that the bus exchange module BEM 50 is assigned the highest priority in order to process invalidation commands (to cache memory) as quickly as possible.

Figure 4A:
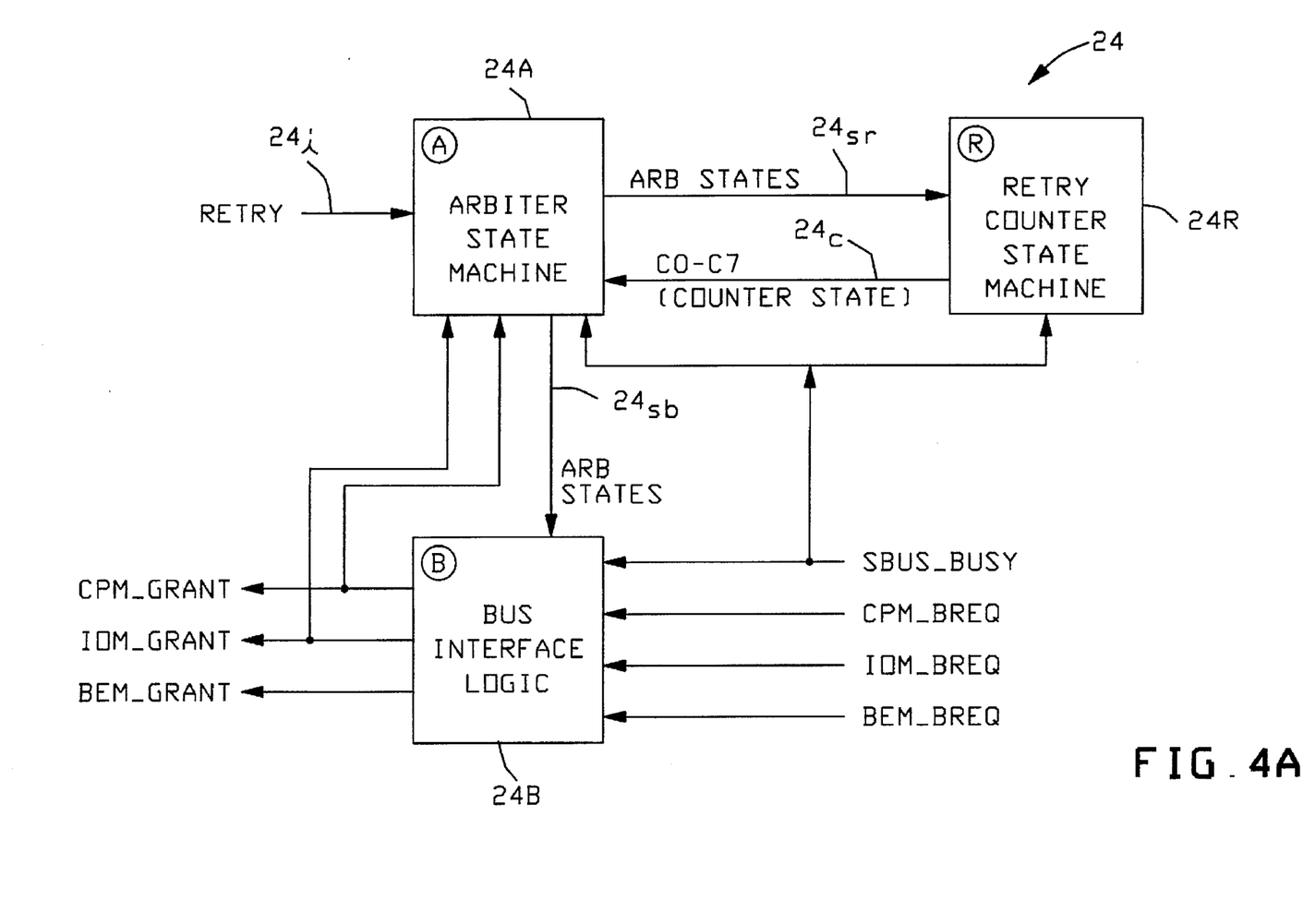
FIG. 4A is a block diagram of the arbitration logic located in the system control module.

FIG. 4A shows the elements of the bus arbitration logic 24 as including an arbiter state machine 24A which interrelates with the retry counter state machine 24R and the bus interface logic 24B.

The bus interface logic 24B is seen to receive inputs of bus requests (BREQ) from the CPM 40, the IOM 60 and the BEM 50 after which it can provide a bus grant (GRANT) to either one of the CPM, the IOM or the BEM.

The arbiter state machine 24A provides arbitration state condition signals on bus lines $24_{sb}$ to the bus interface logic 24B and on $24_{sr}$ to the retry counter state machine 24R. The retry counter state machine 24R outputs "counter-state" signals via lines $24_c$ to the arbiter state machine 24A as indicated in FIG. 4C which shows the incrementation of count signals.

Figure 4B:
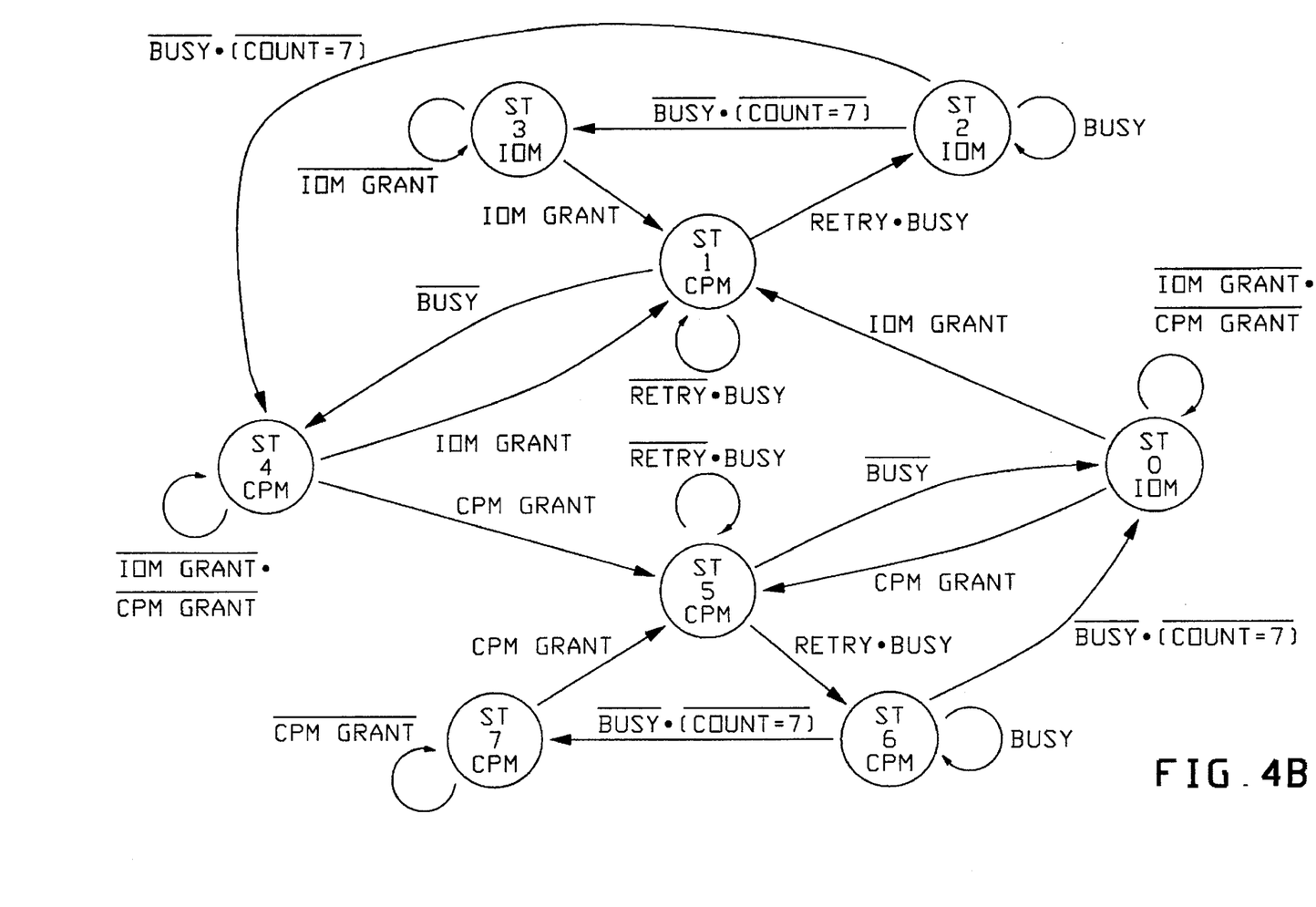
FIG. 4B is a state machine sequence drawing indicating the activity of the arbitration state machine.
Figure 4C:
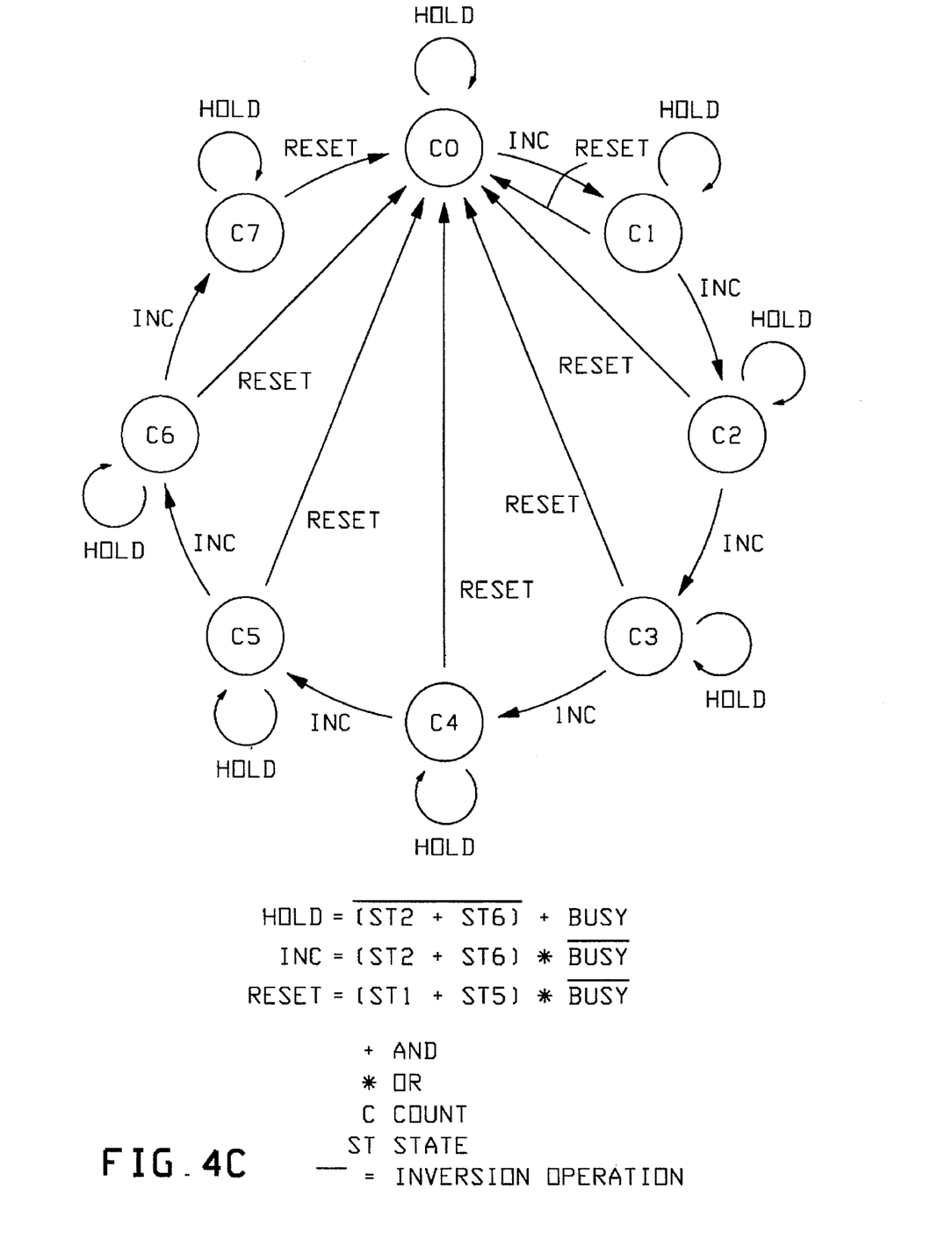
FIG. 4C is a state machine sequence drawing of the retry counter state machine.

The arbiter state machine 24A keeps track, as seen in FIG. 4B, of which module (IOM, CPM) has priority, for system bus access, at any given point in time. It also controls those situations where a requesting module such as the IOM or CPM, may have its bus request "retried" for a number of retry cycles.

The retry counter state machine 24R counts the number of consecutive times (N) that a module (CPM, IOM) has had its request for bus access retried.

The bus interface logic 24B (FIG. 4A) senses the bus request signals and, based on the state information from the arbiter state machine 24A, will issue the bus grant (GRANT) to the appropriate requesting module.

The logic equations under which the bus interface logic functions are shown below:

$No\_Gnt\_B := (Cpm\_Bgnt\_B = IOM\_Bgnt\_B * Bem\_Gnt\_B)$ $Bem\_Gnt\_B := (Bem\_Breq\_B + En\_BemReq\_B + /S\_Busy\_B + \\ +/No\_Gnt\_B + /Cpm\_Bgnt\_B + /IOM\_Bgnt\_B$ $Cpm\_Bgnt\_B := (/S\_Busy\_B + Cpm\_Breq\_B + En\_Cpmreq\_B \\ +/No\_Gnt\_B + /Bem\_Gnt\_B + /IOM\_Bgnt\_B \\ +/Bem\_Breq\_B + En\_BemReq\_B) \\ +(/IOM\_Breq\_B * /En\_IOMReq\_B * State0) \\ +State1 + State2 + State3)$ $IOM\_Bgnt\_B := (/S\_Busy\_B + IOM\_Breq\_B + En\_IOMreq\_B \\ +/No\_Gnt\_B + /Cpm\_Bgnt\_B + /Bem\_Gnt\_B \\ +/Bem\_Breq\_B + En\_BemReq\_B) \\ +(/Cpm\_Breq\_B * /En\_CpmReq\_B * State4) \\ +State5 + State6 + State7)$ Note: In these equations the following notations are indicated:
+ = OR operator
* = AND operator
En = enable
: = designates FF output
/ = inversion operation In regard to the arbitration logic 24 of FIGS. 1 and 2, and in regard to the functioning of the arbitration state machine 24A shown in FIG. 4B, it will be seen that several components are used to provide the arbitration logic 24. These consist of:

(a) an arbiter state machine 24A which cycles through eight state conditions.

(b) a three-bit counter in state machine 24R (FIG. 4A) which is used to count RETRY conditions.

(c) three bus request input signals (CPM_BREQ_B, BEM_BREQ_B, IOM_BREQ_B) as input to the arbitration logic modules 24a, 24b, FIG. 2.

(d) three input signals involving three bus request enable signals as input to the arbitration logic $24_a$, $24_b$. These involve switches which can be set by software routines in order to "disable" a module by not allowing the arbiter logic 24 to grant bus access to that module.

(e) an input signal to the arbitration logic units 24a, 24b which indicates that the SBUS 22a, 22b (FIG. 2) is busy, that is, SBUS_BUSY.

(f) an input signal on line $24_i$, FIG. 4A, to the arbitration logic 24 which is designated as the SBUS Retry input signal.

(g) the bus interface logic 24B of arbitration logic 24 having three bus grant output signals, CPM_GRANT, IOM_GRANT, BEM_GRANT (FIG. 4A).

FIG. 4B is a state diagram indicating the various state conditions operative in the arbitration state machine 24A. The designations IOM or CPM within each of the state circles identifies the module which has the bus access priority in that particular state. The active flows shown between the various state conditions of state "0" through state "7" handle the contention between the central processing module CPM 40 and the input/output module IOM 60. This is so since the bus exchange module BEM 50 is always given a higher priority than either of the other two modules CPM and IOM and thus, the BEM 50 will be granted first priority to the system bus 22 during any of the states if the BEM is requesting the system bus 22 and the bus is "not busy". The equation which is used for granting the system bus 22 to the bus exchange module BEM 50 is shown in equation EQ1:

EQ1:

$$BEM\_Bgnt\_B := (Bem\_BreqFF\_B + En\_BEMReq\_B + /S\_Busy\_B \\ +/No\_Gnt\_B) + /CPM\_Bgnt\_B + /IOM\_Bgnt\_B$$

Since the system bus grant is generated by a flip-flop, the "bus grant" signal will become active on the next rising clock edge after the system bus 22 is "not busy" and the request enable signal is active and the BEM 50 has its request active and that the following conditions do not apply:

Condition 1: The bus grant flip-flop was "not set" for the CPM 40 or the IOM 60 on the previous rising clock edge. This is illustrated by the timing diagram of FIG. 5. If the signal S-BUSY-B becomes inactive at clock period number 2, (that is to say the bus is no longer busy), then the signal CPM5 BGNT-B will be activated on clock period number 3, because the signal CPM-BREQ-B is the only active bus request.

Figure 5:
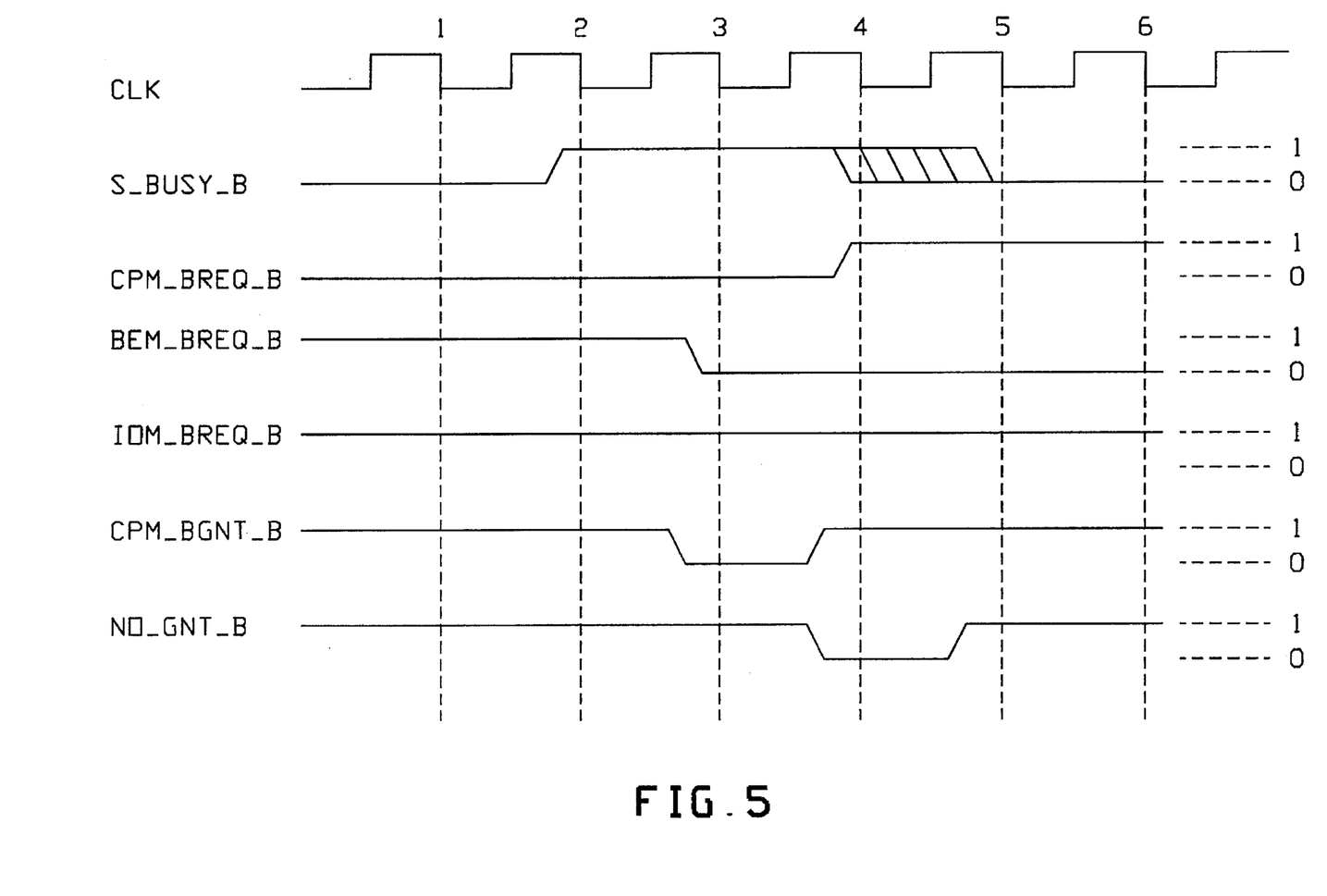
FIG. 5 is a typical timing grant showing how the central processing module is enabled for being granted access to the system bus.

However, if the signal BEM-BREQ-B becomes active in clock period number 3, the BEM 50 must not be granted in clock period number 4. Either one of the signals CPM-BGNT-B or IOM-BGNT-B must prevent the BEM 50 grant of a bus access because the signal S-BUSY-B will not become active due to the CPM grant until at least some period of time in clock number 4, which is already too late to prevent a grant to some other module in the clock number 4 period.

Condition No. 2: The signal NO-GNT-B must not be active. This is a safeguard in case the signal S-BUSY-B becomes active too late in clock number 4 or is even delayed until clock number 5. The no grant signal is shown in the last (bottom line) of FIG. 5.

If the bus exchange module BEM 50 is not requesting the system bus 22, then the current state of the state machine as illustrated in FIG. 4B will determine whether the CPM 40 or the IOM 60 will be granted access to the system bus SBUS 22.

As seen in FIG. 4B, the arbitration state machine is initialized to begin in state "0". In this state, if the IOM bus request beats or ties "in time" the CPM bus request, then the IOM will be granted access to the system bus 22. After the IOM has completed its operation cycle, the system will then "toggle" the priority to the CPM. The equation used to grant the system bus to the IOM 60 is shown as EQ2:

EQ2:

$$IOM\_BGNT\_B := (/S\_Busy\_B + IOM\_BreqFF\_B + En\_IOMReq\_B \\ +/No\_Gnt\_B) + /CPM\_Bgnt\_B + /BEM\_Bgnt\_B \\ +/(BEM\_BreqFF\_B + En\_BEMReq\_B) \\ +(/CPM\_BreqFF\_B * /En\_CPMReq\_B) * State4) \\ +State5 + State6 + State7)$$

Then, after the system bus is granted to the IOM 60, the state machine will proceed to "state 1" where it will wait for one of the following conditions to occur:

State 1 Condition 1: If S-BUSY-B becomes inactive (that is to say, the system bus busy signal becomes inactive) this means that the IOM 60 has completed its operation. This will then cause the state machine to proceed to state 4 where the CPM will get its next chance to control the system bus SBUS 22 if its bus request precedes or "ties in time" the next IOM bus request.

State 1 Condition 2: A Retry is detected on the system bus 22. This detection can occur for one of the following reasons:

(a) A message command is retried by the bus exchange module BEM 50 because it has not yet finished processing the previous message transfer.

(b) A memory write request is retried by the BEM 50 because it cannot process the invalidation command to its local CPM at the present time period.

(c) A memory write command by the IOM 60 is retried by the CPM 40 because the CPM 40 cannot handle the address of the operation to place it into its invalidation queue (of the cache memory) at the present time moment.

(d) A message command is retried by the central processing module CPM 40 because the CPM must first gain control of the system bus (SBUS 22) to send out the command before it can receive the message.

The above case 2(a) (of state 1 condition 2) is relatively easy to handle since the BEM 50 has the highest priority, and it will be able to quickly process the previous message so that it does not need to continuously retry the new command. Further, since message commands are relatively rare, the BEM 50 will not generally be expected to become swamped with messages from another module, so the BEM 50 can process the retried message in a relatively short period of time and thereby prevent any starvation conditions from occurring.

Figure 6:
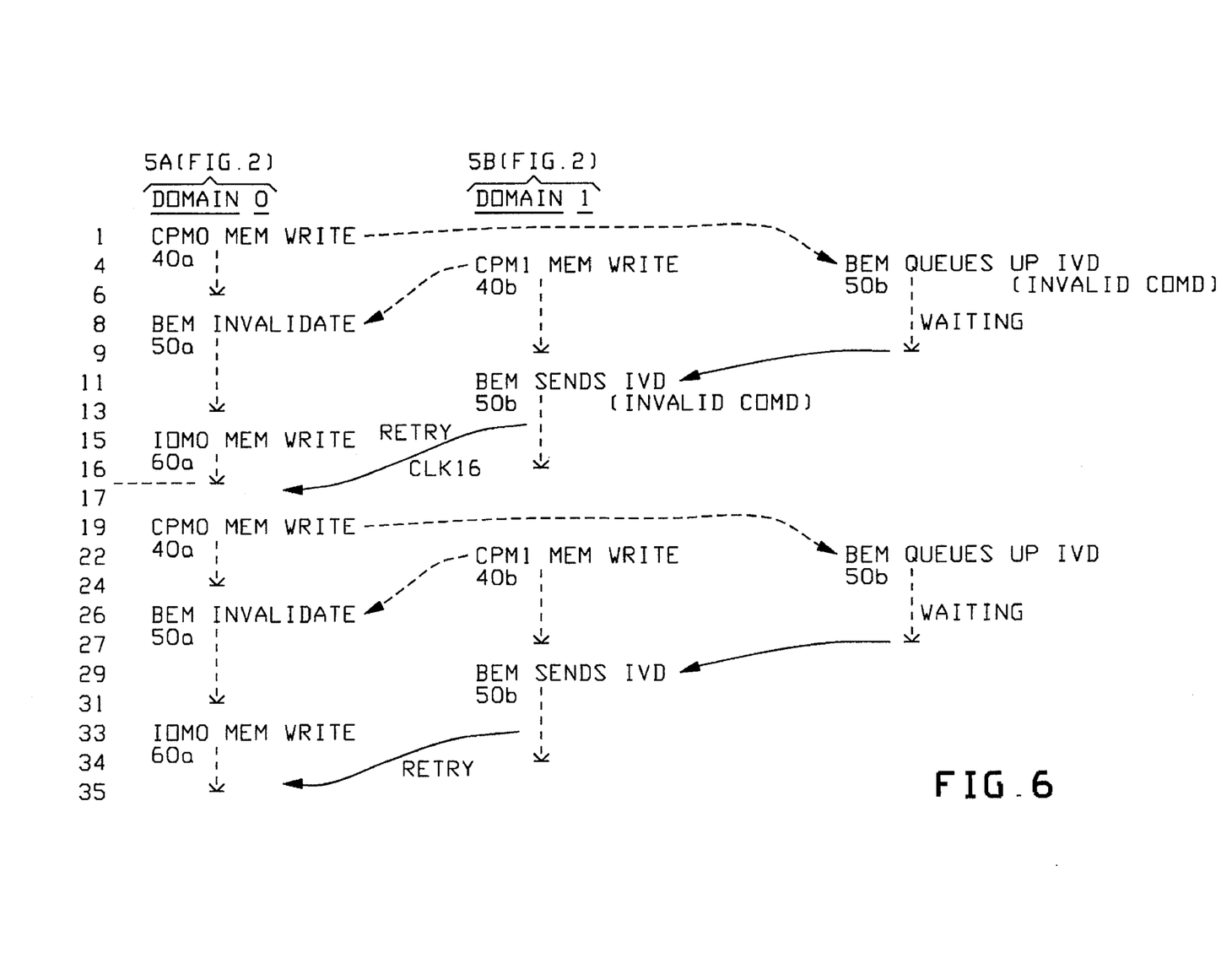
FIG. 6 is drawing by which it is illustrated how a starvation condition can occur for a resource module such as the input/output module, IOM.

On the other hand, there is some potential for a "starvation condition" to arise in cases of 2(c) and 2(d). FIG. 6 is a drawing providing an example of how an input/output module, such as IOM $60_a$, can be indefinitely prevented (starved) from completing a "write operation."

First, it will be seen that the central processing module CPM $40_a$ is controlling the system bus $22_a$ (FIG. 2) with an overwrite operation in an attempt to reach the CPM $40_b$ cache, during clocks i through 6. While this is occurring, the other system bus SBUS $22_b$ (FIG. 2) in the domain 1 of partition 5B, is busy with a write operation from CPM $40_b$ attempting to reach the CPM $40_a$ during clocks 4 through 9.

Regarding cases 2(b) and 2(c) above, there is thus a potential for a starvation condition to arise. FIG. 6 will indicate an example of how the input/output module IOM $60_a$ can be indefinitely prevented from completing its Write operation.

At first the central processing module CPM $40_a$ (FIG. 2) will be seen to control the system bus $22_a$ with an overwrite operation attempting to reach CPM $40_b$ in clocks 1 through 6, indicated at the left edge of FIG. 6.

While this is occurring, the other system bus $22_b$ in domain partition i (5B of FIG. 2) is still busy with a CPM $40_b$ Write operation seeking to reach CPM $40_a$ during clocks 4 through 9.

A bus exchange module BEM $50_a$ queues up the Write address from CPM $40_b$ and sends an invalidation command to the CPM $40_a$ on the system bus SBUS $22_a$ during clocks 8 through 13.

The bus exchange module BEM $50_b$ in the domain partition I (5B, FIG. 2) queues up to the address of the CPM $40_a$ Write operation, but then it (BEM $50_b$) has to wait before it can send the invalidation command to the CPM $40_b$ on the system bus $22_b$ since $22_b$ is busy.

While the system bus $22_b$ is waiting, then the other system bus $22_a$ becomes free again and the input/output module IOM $60_a$ may now attempt a memory write operation to reach the CPM $40_b$ cache, starting at clock 15.

However, since the BEM $50_b$ has not yet sent the "previous" invalidation command to the CPM $40_b$, it then has no place to store the address received from the IOM $60_a$ overwrite, since the BEM $50_b$ only has a short queue that is one level deep. Thus, this will cause the BEM $50_b$ to work on "retry" operations on clock 16.

Under these conditions, the request cycles can repeat themselves again indefinitely if both of the central processing modules CPM $40_a$ and CPM $40_b$ are both doing bursts of consecutive writes. In this type of situation where both CPMs are active, this will eventually "starve" the input/output module IOM $60_a$ in this particular situation.

This, of course, is a condition which must be avoided and thus the present arbitration logic system 24 will prevent such a situation from occurring by giving a requesting module that has just been retried, a temporary higher priority of operations until it has completed its operation.

On the other hand, if a module had been given too high a priority, a "deadlock" condition, such as that mentioned earlier in case 2(b) above, can occur. In this situation, if the retried module is "always" given the higher priority, then the system can never resolve the case where the retry is caused by a module that needs to gain access to a system bus 22 to alleviate the condition where it caused the retry in the first place.

The solution to this type of unwanted problem is indicated in the arbitration state diagram of FIG. 4B. If the input/output module IOM 60 has already gained access to the system bus SBUS 22, the state machine will move to state 1, where it waits for the requested operation to complete or else enable a "retry" to recur.

If a retry does occur, then the state machine will move to state 2, where it will wait for the "bus busy" signal to become "inactive" which then signals the official end of the operation which has just been retried. When this occurs, the 3-bit counter, designated as the "retry" counter (FIG. 4C), will be incremented and the state machine will then move to state 3 (FIG. 4B).

The retry counter (24C) keeps track of how many times a particular operation has been retried. For the first seven times that an operation is retried, that particular resource module will be given a "second highest priority" for access to the system bus 22 (since the BEM will always have top priority). It will be seen, however, that the BEM 50 will still have the highest priority even in this situation.

Thus, the module which has just retried its operation for seven times and has been given the second highest priority (after the BEM) will operate to lock out the other module temporarily from access to the system bus 22. Thus, it can be seen from the arbitration state (FIG. 4B), this CPM 40 can never be granted access to the system bus 22. This is so since the BEM 50 has the top or highest priority and the module doing the seven retries has been given the second highest priority. Then, this leaves the other or third module being temporarily locked off of the system bus 22, that is to say the processor module CPM $40_a$. Thus, from state 3, the CPM $40_b$ can never be granted access to the system bus In FIG. 4B, once the state machine enters state 3, the arbiter logic will wait for the IOM 60 to re-request the system bus 22 and once the IOM gets the Bus Grant, the state machine returns to state 1. At this point, the cycle from state 1 to state 2 to state 3 will be broken in one of two ways:
(a) The operation finally completes without being retried.
(b) The operation is retried for the eighth time.

In both of these cases the arbitration state machine proceeds to state 4 where the CPM 40 can then be allowed to use the SBUS 22 and the retry counter is cleared to "0".

The reason for this course of events occurring for the second case (b) above, is to prevent the possible deadlock condition mentioned previously under Case 2(d).

If the IOM 60 is constantly being retried by the CPM 40 because the CPM 40 must gain control of the system bus 22 before it can allow an operation by the IOM 60 to be completed, the transition to state 4 will then make this possible. As a result of this algorithm, it is possible to allow a retried module to temporarily gain a higher priority in order to prevent starvation, but still allow for a way to eventually discontinue that advantage so that there is no occurrence of a deadlock condition.

The described system provides for sharing access and usage of a single system bus means in which a system control module provides an arbitration logic system which enables the optimum operation for access to the system bus by three different resource modules designated as the central processing module, the input/output module and the bus exchange module.

While the bus exchange module is given the highest priority, conditions can occur where one of the resource modules can be put in a condition of starvation and non-access to the system bus. Other conditions can occur where a "deadlock" situation occurs such that two resource modules which are requesting access to each other can be locked-up and never complete their cycles of operation.

The present arbitration system in the system control module provides for an arbitration state machine system which handles and resolves any problems that might occur in terms of resource module starvation for access to the bus and in terms of the prevention of deadlock between contending modules for access to the bus.

Described herein has been a partitionable dual digital module network wherein each network includes a common system bus means which connects and input/output module, a central processing module, a system control module and a bus exchange module.

Each network provides an arbitration logic unit in the system control module which allocates priority of bus access to the bus exchange module and then subsequently allocates secondary priority of access by toggling between the IOM module and then the central processing module (CPM). However, on those occasions where the input/output module or the central processing module are in a condition of requesting access to a system bus which is busy, the requesting module will be enabled to retry its bus access request for a number of N times after during which it will be given a temporary higher priority for bus access which temporary higher priority will then be eliminated after the bus access of the module has been completed.

What is claimed is:

1. In a network using two partitioned systems wherein a first partitioned system includes a first system control module holding a first arbiter unit for controlling access of a first central processing module (CPM), a first input/output module (IOM) and a first bus exchange module (BEM) to a first system common bus, said first arbiter unit having a first arbiter state machine controlling a first bus interface unit and first retry counter state machine, and wherein a second partitioned system includes a second system control module holding a second arbiter unit for controlling access of a second CPM, a second IOM and a second BEM to a second system common bus, said second arbiter unit having a second arbiter state machine controlling a second bus interface unit and second retry counter state machine, a method for coupling said first and second partitioned systems for data transfers while enhancing throughput and preventing lockup or module starvation of bus access, said method comprising the steps of:

(a) regulating the priority of bus access to said first system common bus by setting priority of access between said first CPM, said first IOM and said first BEM;

(b) regulating the priority of bus access to said second system common bus by setting priority of said second common system bus access between said second CPM, said second IOM and said second BEM;

(c) transmitting data from said first system common bus via said first system control module to said second BEM;

(d) transmitting data from said second system common bus via said second system control module to said first BEM module;

(e) allocating the highest priority of access on said first and second system buses respectively to said first and second BEMs on a general basis except when said first/second IOM and said first/second CPM are locked up trying to access each other concurrently;

(f) allocating a temporary second-level priority to said first/second IOM and third priority to said first/second CPM for system common bus access respectively in said first and second partitioned systems, said temporary second level priority being transferred to said first/second CPM immediately after said IOM has completed its operation cycle;

(g) enabling a multiple number N of retry cycles for any IOM or CPM whose bus access request is incomplete said enabling effected on an alternate priority sequence as long as said BEM is inactive and not requesting bus access;

(h) allocating a temporary higher priority to a requesting first/second IOM or CPM after N retry cycles by a CPM or IOM so as to enable toggling of priority between said IOM and CPM;

(i) eliminating said temporary higher priority for said first/second IOM or CPM after completion of its bus access request;

(j) subordinating said temporary higher priority of said first/second IOM and CPM to said first/second BEM during any bus request by said first/second BEM after said first/second IOM or CPM has completed N retries or has completed its bus access request.

2. The method of claim 1 which includes the step of:

(k) setting said first/second bus interface unit to disable a bus request from either said first/second CPM, said first/second IOM, or said first/second BEM.

3. A system for enabling communication between a first common system bus in a first network and a second common system bus in a second network while enhancing throughput and preventing lockup or module starvation of bus access, comprising:

(a) a first network having a first central processing module, a first input/output module and first bus exchange module all sharing a first system common bus with a first system control module, said first bus exchange module enabling data transfers to said second common system bus;

(b) a second network having a second central processing module, a second input/output module and second bus exchange module all sharing a second system common bus with a second system control module, said second bus exchange module enabling data transfers to said first common system bus;

(c) each said first and second system control modules having respective first and second arbitration logic means wherein each arbitration logic means includes:

(c1) means for allocating top priority of access on said first and second system common buses, respectively, to the respective first and second bus exchange modules and subsequently, when there is no bus exchange module request, enabling a toggling sequence which grants access priority to the first-in-time requesting module of said input/output module or central processing module until said first-in-time requesting module has completed its outstanding access request cycle after which access priority is then re-allocated to said second-in-time requesting central processing module or input/output module, except when both IOM and CPM requests are simultaneous-in-time and priority of access is granted first to said IOM:

(c2) retry counter state machine means for counting each unsuccessful bus access request by said input/output module or said central processing module and indicating when N retries have been used by said input/output module or said central processing module;

(c3) means to alternately grant a temporary higher access priority between a requesting input/output module and a requesting central processing module after the first of the two requesting modules granted bus access has unsuccessfully tried N retries for bus access during periods when said bus exchange module is not requesting access and said system common bus is not busy.

* * * * *